United States Patent
Chappellet et al.

(10) Patent No.: US 11,952,524 B2
(45) Date of Patent: Apr. 9, 2024

(54) COMPOSITIONS OF POLYMERIZABLE LIQUID CRYSTALS

(71) Applicant: ROLIC TECHNOLOGIES AG, Allschwil (CH)

(72) Inventors: Sabrina Chappellet, Village-Neuf (FR); Richard Frantz, Village-Neuf (FR)

(73) Assignee: ROLIC TECHNOLOGIES AG, Allschwil (CH)

(*) Notice: Subject to any disclaimer, the term of this patent is extended or adjusted under 35 U.S.C. 154(b) by 23 days.

(21) Appl. No.: 17/634,308

(22) PCT Filed: Aug. 24, 2020

(86) PCT No.: PCT/EP2020/073585
§ 371 (c)(1),
(2) Date: Feb. 10, 2022

(87) PCT Pub. No.: WO2021/037774
PCT Pub. Date: Mar. 4, 2021

(65) Prior Publication Data
US 2022/0298418 A1     Sep. 22, 2022

(30) Foreign Application Priority Data
Aug. 28, 2019 (EP) .................... 19194021

(51) Int. Cl.
| G02F 1/1333 | (2006.01) |
| C09K 19/04 | (2006.01) |
| C09K 19/06 | (2006.01) |
| C09K 19/30 | (2006.01) |
| C09K 19/34 | (2006.01) |

(52) U.S. Cl.
CPC ........ *C09K 19/0403* (2013.01); *C09K 19/067* (2013.01); *C09K 19/3003* (2013.01); *C09K 19/3068* (2013.01); *C09K 19/3452* (2013.01); *C09K 19/3477* (2013.01); *C09K 19/3497* (2013.01); *C09K 2019/0414* (2013.01); *C09K 2019/0448* (2013.01); *C09K 2019/3009* (2013.01); *C09K 2019/3075* (2013.01)

(58) Field of Classification Search
CPC .............. C09K 19/0403; C09K 19/067; C09K 19/3003; C09K 19/3068; C09K 19/3452; C09K 19/3804; C09K 19/3477; C09K 19/3497; C09K 2019/0414; C09K 2019/0444; C09K 2019/0448; C09K 2019/3009; C09K 2019/3075; G02F 1/1333
See application file for complete search history.

(56) References Cited

U.S. PATENT DOCUMENTS

| 4,122,027 | A | 10/1978 | Cole, Jr. et al. |
| 4,401,369 | A | 8/1983 | Jones |
| 4,565,424 | A | 1/1986 | Huffman et al. |
| 4,667,020 | A | 5/1987 | Etzbach et al. |
| 5,389,285 | A | 2/1995 | Shannon et al. |
| 5,539,074 | A | 7/1996 | Herr et al. |
| 6,107,427 | A | 8/2000 | Herr et al. |
| 6,201,087 | B1 | 5/2001 | Herr et al. |
| 6,632,909 | B2 | 10/2003 | Buchecker et al. |
| 7,959,990 | B2 | 6/2011 | Cherkaoui et al. |
| 2017/0174992 | A1 | 6/2017 | Ootsuki |
| 2017/0369783 | A1 | 12/2017 | Horiguchi et al. |
| 2018/0037817 | A1 | 2/2018 | Kuwana et al. |
| 2018/0312481 | A1 | 11/2018 | Horiguchi et al. |
| 2018/0319755 | A1 | 11/2018 | Teng et al. |
| 2019/0225884 | A1 | 7/2019 | Nakajima et al. |
| 2019/0233565 | A1 | 8/2019 | Endo et al. |
| 2022/0228063 | A1* | 7/2022 | Chappellet ......... C09K 19/3497 |
| 2022/0251450 | A1* | 8/2022 | Yamauchi ............... C09K 19/24 |
| 2022/0259148 | A1* | 8/2022 | Yamauchi ............ G02B 5/3016 |
| 2022/0298418 | A1* | 9/2022 | Chappellet ......... C09K 19/3477 |

FOREIGN PATENT DOCUMENTS

| EP | 2 703 385 A1 | 3/2014 |
| EP | 2 857 424 A1 | 4/2015 |
| JP | 2016-128403 A | 7/2016 |
| WO | 2008/077261 A1 | 7/2008 |
| WO | 2012/085048 A1 | 6/2012 |
| WO | 2016/104317 A1 | 6/2016 |
| WO | 2017/043437 A1 | 3/2017 |
| WO | 2018/099883 A1 | 6/2018 |

OTHER PUBLICATIONS

International Search Report dated Oct. 27, 2020 in International Application No. PCT/EP2020/073585.
Written Opinion of the International Searching Authority dated Oct. 27, 2020 in International Application No. PCT/EP2020/073585.

* cited by examiner

*Primary Examiner* — Geraldina Visconti
(74) *Attorney, Agent, or Firm* — Sughrue Mion, PLLC

(57) ABSTRACT

The invention relates to novel compositions comprising at least two anisotropic compounds of formula

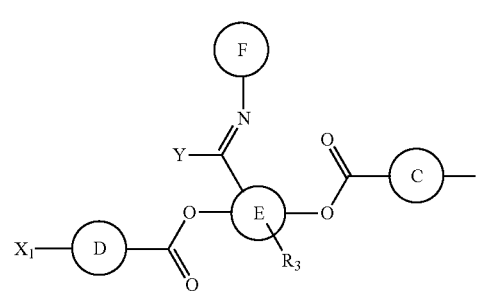

(I)

as well as to liquid crystalline networks, films and electro-optical devices comprising the compositions.

20 Claims, No Drawings

COMPOSITIONS OF POLYMERIZABLE LIQUID CRYSTALS

CROSS REFERENCE TO RELATED APPLICATIONS

This application is a National Stage of International Application No. PCT/EP2020/073585 filed Aug. 24, 2020, claiming priority based on European Patent Application No. 19194021.2 filed Aug. 28, 2019.

BACKGROUND OF THE INVENTION

The present invention relates to novel compositions comprising at least two different polymerizable anisotropic Liquid Crystals (LCPs) compounds, to formulations comprising such LCPs compounds and to optical films comprising such LCPs compositions. Optical films comprising the compositions according to the present invention shown reverse retardation pattern of polarized light over a wide wavelength band. Finally, the present invention relates to optically anisotropic articles comprising such compositions or comprising optical films comprising such compositions such as, e.g. flat displays, TVs, smartphones, tablets.

Optical films prepared from curable LCPs compounds (LCP films) are well known to a skilled person and are used in the preparation of optical devices. Examples of optical films are retardation films or polarizers. Retardation films are a type of optical elements which change the polarization state of light passing through the same. When light passes through a retardation film, the polarization direction of the light changes because of the birefringence and the thickness of the film. Quarter-wave retardation plates convert linearly polarized light into circularly polarized light, and half-wave retardation plates convert the plane of vibration of linearly polarized light by 90°. Such retardation films can achieve conversion of specific monochromatic light so that $\lambda/4$ or $\lambda/2$ retardation occurs. However, the known retardation films have the drawback that the polarized light that passes through is converted into coloured polarized light. Further, a polarization state distribution corresponding to each wavelength occurs for polarized white light. Therefore, it is impossible to achieve accurate $\lambda/4$ or $\lambda/2$ retardation over the entire wavelength band. To improve such drawbacks, there is the need to develop retarder films having a wavelength dispersion which is higher in the long wavelength than in the short wavelength. Another issue in preparation of retardation films, also known as retarders, is to prepare high performing films at a small charge of materials.

There is, therefore, a need for new LCPs compositions that may be used in the preparation of an optical film as described above, which significantly reduces the aforementioned disadvantages. The present invention addresses that need.

Several anisotropic LCP compounds are already known in the art, but there is still the demand to develop new LCP compounds with improved uniform conversion of polarized light over a wider wavelength. Few examples of such anisotropic LCP compounds are disclosed in WO2012/147904, WO2016/104317, WO2017/043437 and JP2016/128403.

The present invention covers composition comprising at least two anisotropic LCPs, to LCP networks comprising said compositions and to optical and electro-optical devices, such as optical films, comprising said compositions or said networks. It has been shown that the optical films comprising such compositions are surprisingly much more effective in the conversion of polarized light compared to optical films comprising only one LCP.

LCP films are generally manufactured by method well-known by the skilled person. This involves coating an organic solution of a cross-linkable LCP or LCP compositions onto a substrate provided with an orientation layer or onto a substrate which has previously been treated by the rubbing technique. Or other aligning techniques for liquid crystals may be used. The organic solvent is subsequently removed to give a well-oriented, solvent-free LCP layer, which in turn is cross-linked to fix the liquid crystalline properties ordered structure. The desired optical performance of such films depends crucially on some physical parameters which the anisotropic LCP material has to fulfil simultaneously. Such properties are a low melting point or a low tendency to crystallise when cooled below melting point (supercooling), good solubility in organic solvents, good miscibility with other LCPs, good aligning properties on orientation layers, and the ability to form an adjustable tilt out of the substrate plane essentially free of tilt domains and disclinations. Tilt domains are regions within the LCP film in which the long axes of the LCP molecules form tilt angles out of the plane of the substrate of the same size but in opposite direction. Disclinations are borderlines of neighbouring tilt domains where LCP molecules of opposite tilt angles are adjacent. These tilt domains and disclinations result in both a disturbance in the uniform appearance of the film and an inhomogeneous optical performance.

SUMMARY OF THE INVENTION

It is a first object of the present invention to provide composition comprising at least two anisotropic LCP compounds as described by formula (I) and to formulations comprising at least one of said compounds and at least one additive and/or a solvent.

It is a further object of the present invention to provide an optical film comprising said LCP compositions and to methods of its preparation, to the use of said optical film as retardation film achieving uniform conversion of polarized light and to devices comprising said optical films and their manufacturing.

DETAILED DESCRIPTION OF THE INVENTION

The first aspect of the invention provides a composition comprising at least two anisotropic liquid crystalline compounds of formula (I)

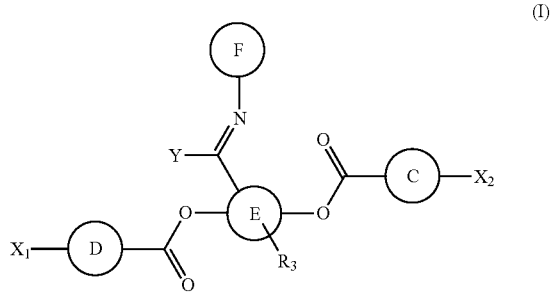

(I)

with the proviso that the two liquid crystalline compounds are different and comprise two different rings F, wherein ring F is selected from formulae (IIa), (IIb) or (IIc) as described below.

The second aspect of the invention provides a formulation comprising the LCP compositions of the first aspect of the invention and at least one solvent and/or additive.

Further, the invention provides LCP networks comprising said compositions or LCP formulations, the use of said LCP compositions or formulations or LCP networks and optical or electro-optical devices comprising said compositions, formulations or networks.

In the compounds of formula (I), ring F is selected from the group consisting of the groups of formulae (IIa), (IIb) or (IIc)

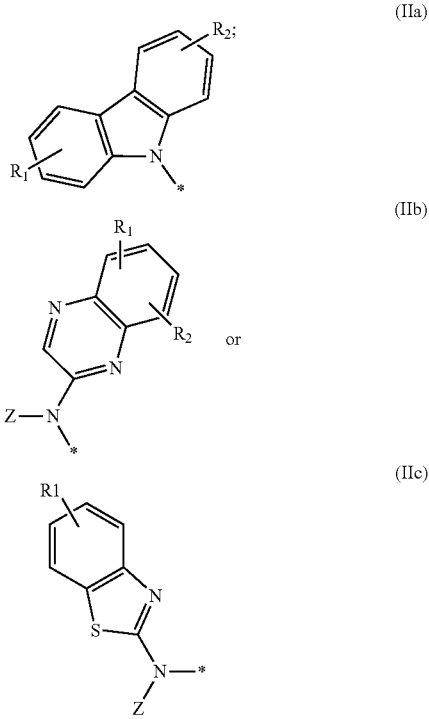

wherein "*" represents the bonding to ring the nitrogen atom of the compound of formula (I); and wherein Z is selected from the group consisting of hydrogen, a substituted or unsubstituted alkyl group having 1 to 20 carbon atoms, a substituted or unsubstituted alkenyl group having 2 to 20 carbon atoms, a substituted or unsubstituted cycloalkyl group having 3 to 12 carbon atoms, a substituted or unsubstituted alkynyl group having 2 to 20 carbon atoms, wherein one or more carbon atoms may be replaced by —O—, —COO—, —OCO—, —OOC—, —O(CO)O—, —N—, —NR$^a$—, —CON—, —CO—R$^b$, —NH—R$^c$, wherein R$^a$ is a $C_1$-$C_{12}$ alkyl group, R$^b$ and R$^c$ are independently from each other a substituted or unsubstituted alkyl group having 1 to 20 carbon atoms, or an organic group having 2 to 30 carbon atoms that includes at least one aromatic ring, or a substituted or unsubstituted alkenyl group having 2 to 20 carbon atoms, or a substituted or unsubstituted cycloalkyl group having 3 to 12 carbon atoms.

Preferably, Z is selected from the group consisting of hydrogen, a substituted or unsubstituted alky group having 1 to 12 carbon atoms.

In the compounds of formulas (I), (IIa), (IIb) and (IIc), $R_1$, $R_2$ and $R_3$ are independently from each other selected from the group consisting of hydrogen, $C_1$-$C_{12}$ straight or branched alkyl chain, $C_3$-$C_{12}$ alkenyl, $C_1$-$C_{12}$ alkoxy, $C_3$-$C_{12}$ alkenyloxy, —$(CH_2)_m$—$C(CH_3)_3$, $NO_2$, CN, COR, —COOR, —OCOR, —CONR'R, —NR'COR, OCOOR, —OCONR'R, —NR'COOR, —F, —Cl, —$CF_3$ and —$OCF_3$;

in which m is an integer between 0 and 12;

R is selected from the group consisting of hydrogen, an $C_{1-18}$ alkyl group, an $C_{3-18}$ alkenyl group with the double bond at 3-position or higher, —$(CH_2)_p$—C—$(CF_3)_3$, CN and unsubstituted or substituted phenyl ring, wherein the substituent of the phenyl ring is selected from the group consisting of $C_1$-$C_6$ straight or branched alkyl chain, $C_1$-$C_6$ alkoxy, —C—$(CH_3)_3$, halogen, —$CF_3$, $NO_2$, CN, COR''', —COOR''', —OCOR''', —CONR''R''', —NR'COR''', OCOOR''', —OCONR''R''', —NR''COOR''', —F, —Cl, —$CF_3$ and —$OCF_3$;

in which

R'' is selected from the group consisting of hydrogen, a lower alkyl group and a lower alkenyl group;

R''' is selected from the group consisting of hydrogen, an $C_{1-18}$ alkyl group and an $C_{3-18}$ alkenyl group with the double bond at 3-position or higher;

p is an integer between 0 and 12;

R' is selected from the group consisting of hydrogen, lower alkyl, lower alkenyl and lower alkoxy;

and in which n is 0, 1, 2 or 3.

Preferably, $R_1$, $R_2$ and $R_3$ are independently from each other selected from the group consisting of hydrogen, lower alkyl, lower alkenyl, lower alkoxy, lower alkenyloxy, —F, and —$CF_3$.

Most preferably, $R_1$, $R_2$ and $R_3$ are independently from each other selected from the group consisting of hydrogen, methyl, methoxy, —F, —C—$(CH_3)_3$ and —$CF_3$.

Y is selected from the group consisting of H, or substituted or unsubstituted alkyl group having 1 to 12 carbon atoms.

Rings C and D are independently from each other selected from the group consisting of phenyl, biphenyl, naphthyl, cycloalkyl, preferably cyclohexyl, bicycloalkyl, preferably bicyclohexyl,

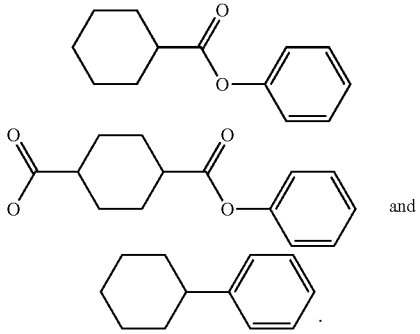

Preferably rings C and D are selected from cyclohexyl and phenyl rings.

In one aspect of the invention, ring C is a cyclohexyl and ring D is a phenyl. In a further aspect both rings C and D are phenyl rings.

Substituents $X_1$ and $X_2$ are independently from each other selected from the group consisting of hydrogen, $C_1$-$C_{12}$ substituted or unsubstituted straight or branched alkyl chain, $C_3$-$C_{12}$ substituted or unsubstituted straight chain or branched alkenyl chain and $C_1$-$C_{12}$ alkoxy, wherein one or more carbon atoms may be replaced by —O—, —COO—, —OCO—, —OOC—, —O(CO)O—, —N—, —NR$^a$—, —CON—, wherein R$^a$ is a C$_1$-C$_{12}$ alkyl group; or substituents X$_1$ and X$_2$ independently from each other are represented by the group of formula (III)

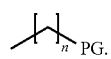

(formula III)

In the group of formula (III), n is an integer between 0 and 24, wherein one or more carbon atoms may be replaced by —O—, —COO—, —OCO—, —OOC—, —O(CO)O—, —N—, —NR$^a$—, —CON—, wherein R$^a$ is a C$_1$-C$_{12}$ alkyl group.

Substituent PG in the group of formula (III) represents a polymerisable group selected from the group consisting of CH$_2$=C(Ph)-, CH$_2$=CW—COO—, CH$_2$=CH—COO-Ph-, CH$_2$=CW—CO—NH—, CH$_2$=CH—O—, CH$_2$=CH—OOC—, Ph-CH=CH—, CH$_2$=CH-Ph-, CH$_2$=CH-Ph-O—, R$^b$-Ph-CH=CH—COO—, R$^b$—OOC—CH=CH-Ph-O— and 2-W-epoxyethyl; in which W represents H, Cl, Ph or a lower alkyl and R$^b$ represents a lower alkyl with the proviso that when R$^b$ is attached to a phenylene group (-Ph-) it may also represent hydrogen or a lower alkoxy. Preferably, PG represents an acrylate or a methacrylate group.

Preferably, substituents X$_1$ and X$_2$ are selected from the group consisting of hydrogen, C$_1$-C$_{12}$ substituted or unsubstituted straight or branched alkyl chain, C$_3$-C$_{12}$ substituted or unsubstituted straight chain or branched alkenyl chain and C$_1$-C$_{12}$ alkoxy when rings C and D are independently from each other cyclohexyl or contain a cyclohexyl.

Preferably, if rings C or D are independently from each other aromatic rings or they contain an aromatic ring, more preferably if C or D are independently from each other phenyl rings or contain phenyl rings, the group of formula (III), is selected from

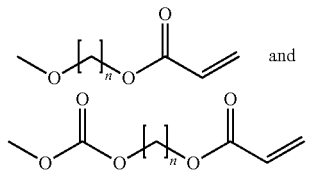

and wherein n has the same meaning as given above or their corresponding methacrylates.

By the term "lower alkyl" it should be understood to include a C$_{1-6}$ achiral, branched or straight-chained alkyl group. Examples of lower alkyl groups that may be present in the compounds of the invention include methyl, ethyl, propyl, butyl, pentyl, hexyl and the like.

By the term "lower alkenyl" it should be understood to include C$_{3-6}$ achiral, branched or straight-chained alkenyl group in which the double bond is at position 2- or higher. Examples of lower alkenyl groups that may be present in the compounds of the invention include 2-propenyl, 3-butenyl, 3-isopentenyl, 4-pentenyl, 5-hexenyl, 4-isohexenyl and the like.

By the term "lower alkoxy" it should be understood to include C$_{1-6}$ achiral, branched or straight-chained alkoxy group. Examples of lower alkoxy groups that may be present in the compounds of the invention include methoxy, ethoxy, propoxy, butoxy, pentoxy hexoxy and the like.

By the term "lower alkenyloxy" it should be understood to include C$_{3-6}$ achiral, branched or straight-chained alkenyloxy group in which the double bond is at position 2- or higher. Examples of lower alkenyloxy groups that may be present in the compounds of the invention include 2-propenyloxy, 3-butenyloxy, 4-pentenyloxy, 5-hexenyloxy and the like.

The compositions according to the first aspect of the invention preferably contain at least one compound comprising ring F of formula (IIa).

The polymerizable anisotropic LCP compounds of the invention may be readily prepared using procedures well known to a skilled person and few non-limiting procedures are provided in the examples.

The starting materials are commercially available or may be readily prepared and are well known to a skilled person.

An anisotropic LCP compound material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer or by rubbing. Polymerization may be initiated by thermal treatment and/or by exposure to actinic light, which preferably comprises UV-light. An anisotropic LCP-material may comprise only a single type of liquid crystal compound, but may also comprise additional polymerizable and/or non-polymerizable compounds, wherein not all of the compounds have to be liquid crystal compounds. If the anisotropic LCP material comprises more than one anisotropic LCP of formula (I) then this material is called, in the contest of the present invention, LCP composition. It is in the context of the present invention than the LCP composition comprises at least two anisotropic LCP of formula (I). Further, the LCP compositions according to the present invention may comprise one or more additional LCP compounds either of formula (I) or different LCP compounds which are not described by formula (I). It is also envisaged by the present invention that the LCP compositions may comprise also additional non-polymerizable compounds such as dyes. In case of optical films, anisotropic LCP monomers are applied on top of a photo-aligning layer or on top of a rubbed surface. After the alignment information of the photo-aligning layer or of the rubbed surface has been transferred to the LCP monomers, the monomers are polymerized and/or cross-linked in order to solidify the LCP material.

The LCP compositions according to the present invention overcome the drawbacks described previously of the LCP compounds of the prior art.

A further object of the present invention relates to formulations comprising at least two anisotropic LCP compounds of formula (I) (the LCP composition) and at least one solvent and/or additive. The additives can be selected from the following: antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, lubricating agents, dispersing agents, a polymeric binder and/or monomeric compounds which can be converted into the polymeric binder by polymerization, or, in the case of emulsion coatings and printing inks, a dispersion auxiliary, hydrophobing agents, adhesive agents, flow improvers, defoaming agents, deaerators, diluents, auxiliaries, colorants, dyes and pigments, curing inhibitors, a chiral additive, isotropic or anisotropic fluorescent and/or non-fluorescent dyes, in particular dichroic dyes and crosslinkers. The solvent that may be used in the preparation of such liquid crystalline compositions include but not limited to acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO). Most preferred solvents are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

The crosslinkers are compounds contain one or more complementary reactive units or polymerizable group P, such as hydroxyl-, thiol-, or amino groups, via which a reaction with the PG of the anisotropic LCP of the compositions according to the present invention can take place. For maintaining the liquid crystalline phase, about 30 wt % or less of the crosslinkers in the claimed composition, based on the total weight of the polymerizable liquid crystal composition, is preferred.

In the context of the present invention, suitable compounds comprising thiol as reactive units or polymerizable group P, which are called polythiols, may be any of those known in the art. As polythiol, any compound can be used which comprises molecules having two or more thiol groups per molecule. The polythiol has a molecular weight in the range from about 50 to about 20,000.

Preferably polythiols are monomeric aliphatic polythiols, oligomeric and polymeric polythiols.

Preferred polythiols relates to di-, tri-, tetra- or multifunctional thiols.

Preferred polymeric polythiol is for example polypropylene ether glycol bis(beta-mercaptopropionate) which is prepared from polypropylene-ether glycol (e.g. Pluracol P201, Wyandotte Chemical Corp.) and beta-mercaptopropionic acid by esterification. Poly-alpha-mercaptoacetate or poly-beta-mercaptopropionate esters, particularly the trimethylopropane triesters or pentaerythritol tetra esters are preferred.

Preferred alkyl thiol functional compounds are for example 1,2-dimercaptoethane, 1,6-dimercaptohexane, decamethylene dithiol, and the like. Thiol terminated polysulfide resins may also be employed.

Preferred aliphatic dithiols include 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol hexanedithiol, dithiodiglycol, pentanedithiol, decanedithiol, 2-methyl 1,4 butanedithiol, bis-mercaptoethylphenyl methane, 1,9-nonanedithiol(1,9-dimercaptononane), glycol dimercaptoacetate.

Preferred oligomeric dithiols include difunctional mercapto functional urethane oligomers derived from end capping moieties of hydroxyethyl mercaptan, hydroxypropyl mercaptan, dimercaptopropane, dimercapto ethane as described in patent by Shustack U.S. Pat. No. 5,744,514.

Preferred trithiol functional compounds include, trimethylolethane tris-mercaptopropionate, trimethylolpropane tris-mercaptopropionate (TMPTSH), trimethylolethane tris-mercaptoacetate, and trimethylolpropane tris-mercaptoaacetate glycerol tri(11-mercaptoundecanoate), trimethylol propane tri(11-mercaptoundecate).

Preferred tetrafunctional thiols include pentaerythritol tetramercapto propionate, pentaerythritol tetramercapto acetate, and pentaeyrthritotetra(11-mercaptoundecate)

To increase the mechanical strength of the liquid crystal film, or to increase the chemical resistance, or both, addition of a compound having two or more polymerizable groups to the composition is preferred. To increase the adhesion of the film to the substrate, addition of a crosslinker having a polar group in a side chain and/or at one terminal position to the composition, is preferred.

Examples of such compounds are well-known to the skilled person and have been described in the prior art, as for example in patent application US 2017/0174992, WO 2018/099883 or WO 2008/077261.

These crosslinkers are usually capable of photopolymerization and include for example, mono-, bi- and polyfunctional compounds containing at least one olefinic double bond. Examples thereof are vinyl esters of carboxylic acids, for example of lauric, myristic, palmitic and stearic acid, and of dicarboxylic acids, for example of succinic acid, adipic acid, allyl and vinyl ethers and methacrylic and acrylic esters of monofunctional alcohols, for example of lauryl, myristyl, palmityl, and stearyl alcohol, and diallyl and divinyl ethers of bifunctional alcohols, for example ethylene glycol and 1,4-butanediol.

Further examples comprise acrylic acid, methacrylic acid, maleic acid, fumaric acid and itaconic acid, styrene, nucleus-substituted styrene, acrylonitrile, vinyl chloride, vinylidene chloride, vinyl pyridine, N-vinyl pyrrolidone, vinylsulfonic acid, fatty acid vinyl ester, α,β-ethylenic unsaturated carboxylic acid, alkyl ester of (meth)acrylic acid in which the number of carbons of alkyl is 1 to 18, hydroxyalkyl ester of (meth)acrylic acid in which the number of carbons of hydroxyalkyl is 1 to 18, aminoalkyl ester of (meth)acrylic acid in which the number of carbons of aminoalkyl is 1 to 18, ether oxygen-containing alkyl ester of (meth)acrylic acid in which the number of carbons of ether oxygen-containing alkyl is 3 to 18, N-vinylacetamide, p-t-butyl vinyl benzoate, N,N-dimethylaminovinyl benzoate, vinyl benzoate, vinyl pivalate, 2,2-dimethylbutane acid vinyl, vinyl 2,2-dimethylpentanoate, vinyl 2-methyl-2-butanoate, vinyl propionate, vinyl stearate, vinyl 2-ethyl-2-methylbutanate, dicyclopentanyloxylethyl (meth)acrylate, isobornyloxylethyl (meth)acrylate, isobornyl (meth)acrylate, adamanthyl (meth)acrylate, dimethyladamanthyl (meth)acrylate, dicyclopentanyl (meth)acrylate, dicyclopentenyl (meth)acrylate, 2-acryloyloxyethyl succinate, 2-acryloyloxyethylhexahydrophthalic acid, 2-acryloyloxyethyl phthalic acid, 2-acryloyloxyethyl-2-hydroxyethyl phthalic acid, 2-acryloyloxyethyl acid phosphate, 2-methacryloyloxyethyl acid phosphate, mono(meth) acrylate, polypropylene glycol, which has a polymerization degree of 2 to 100, and which is capped by di(meth)acrylate ester or an alkyl group having 1 to 6 carbons, and mono (meth)acrylate ester of a copolymer of polyethylene glycol and, ethylene oxide and polypropylene oxide, and the like are the non-liquid crystalline polymerizable compounds being the monofunctional compound.

Examples of difunctional compound are 1,4-butanediol diacrylate, 1,6-hexanediol diacrylate, 1,9-nonanediol diacrylate, neopentyl glycol diacrylate, dimethylol tricyclodecane diacrylate, triethylene glycol diacrylate, dipropylene glycol diacrylate, tripropylene glycol diacrylate, tetraethylene glycol diacrylate, bisphenol A EO-added diacrylate, bisphenol A glycidyl diacrylate, polyethyleneglycol diacrylate and methacrylate.

Examples of trifunctional or higher-functional polyfunctional compound as pentaerythritol triacrylate, trimethylolpropane triacrylate, trimethylol EO-added triacrylate, trisacryloyloxyethyl phosphate, tris(acryloyloxyethyl) isocyanurate, alkyl-modified dipentaerythritol triacrylate, EO-modified trimethylolpropane triacrylate, PO-modified trimethylolpropane triacrylate, pentaerythritol tetraacrylate, alkyl-modified dipentaerythritol tetraacrylate, ditrimethylolpropanetetraacrylate, dipentaerythritol hexaacrylate, dipentaerythritolmonohydroxypentaacrylate, alkyl-modified dipentaerythritol pentaacrylate, pentaerythritol tri(meth)acrylate, trimethylolpropane tri-(meth)acrylate, trimethylol EO-added tri(meth)acrylate, tris(meth)acryloyloxy ethyl phosphate, tris(meth)acryloyloxy ethyl, isocyanurate, alkyl-modified dipentaerythritol tri(meth)acrylate, EO-modified trimethylolpropane tri(meth)acrylate, PO-modified trimethylolpropane tri(meth)acrylate, pentaerythritol tetra(meth)acrylate, alkyl-modified dipentaerythritol tetra (meth)acrylate, ditrimethylol propanetetra (meth)acrylate, dipentaerythritol hexa(meth)acrylate dipentaerythritolmonohydroxy penta methacrylate and alkyl-modified dipentaerythritol pentamethacrylate.

Further, the present invention provides LCP networks comprising the compositions or the formulations according to the first and second aspects. The networks may contain crosslinked and non-crosslinked anisotropic LCP of formula (I).

The present invention relates to an optical film comprising at least one of the anisotropic LCP compounds or compositions according to the present invention. An example of an optical film is a circular polarizer film used as an antireflective film that is produced by combining the optical film according to the present invention with a linear polarizer.

The anisotropic LCP compounds or the composition comprising the anisotropic LCP compounds can be applied on a support. The support may be rigid or flexible and can have any form or shape. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as microstructures like micro lenses or micro-prisms, or structures exhibiting abrupt changes of the shape, such as rectangular structures. Preferably, the support is transparent. The support may also have been subjected to a treatment before coating with the anisotropic LCP compound according to the present invention.

The support may be moving during the deposition of the anisotropic LCP compounds or the composition comprising the anisotropic LCP compounds. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free standing film, without the support.

The support may have additional layers, such as photoaligning layer, organic, dielectric or metallic layers. The layers can have different functions, for example an organic layer can be coated as a primer layer which increases compatibility of the materials to be coated with the support. Metallic layers may be used as electrodes, for example when used in electro-optical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a polarizer, such as a polarizing film or a sheet polarizer, a reflective polarizer, such as the commercially available Vikuity™ DBEF film.

In the context of the present invention, a "photoaligning layer" is made of a material in which anisotropic properties, a photo-orientable substance, can be induced upon exposure to aligning light. In addition the term "photoaligning layer" refers to a layer that has been aligned by exposure to aligning light. For the present invention the induced anisotropy must be as such that it provides alignment capability for the adjacent layer comprising e.g. the anisotropic LCP compounds of formula (I). The term "alignment direction" shall refer to the preferred direction that is induced in the adjacent layer, for example the alignment direction is the direction in which the LCP compounds would be aligned.

Photo-orientable substances incorporate photo-orientable moieties, which are capable of developing a preferred direction upon exposure to aligning light and thus creating anisotropic properties. Such photo-orientable moieties preferably have anisotropic absorption properties. Typically, such moieties exhibit absorption within the wavelength range from 230 to 500 nm. Preferably, the photo-orientable moieties exhibit absorption of light in the wavelength range from 300 to 450 nm, more preferred are moieties, which exhibit absorption in the wavelength range from 310 to 380 nm.

Preferably the photo-orientable moieties have carbon-carbon, carbon-nitrogen, or nitrogen-nitrogen double bonds.

For example, photo-orientable moieties are substituted or un-substituted azo dyes, anthraquinone, coumarin, mericyanine, 2-phenylazothiazole, 2-phenylazobenzthiazole, stilbene, cyanostilbene, fluorostilbene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxycarboxylic derivatives, arylester, N-arylamide, polyimide, diaryl ketones, having a ketone moiety or ketone derivative in conjugation with two aromatic rings, such as for example substituted benzophenones, benzophenone imines, phenylhydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-orientable moieties comprise arylazo, poly(arylazo), stilbene, cyanostilbene, cinnamate or chalcone.

A photo-orientable substance may in particular be a monomer, a oligomer or a polymer. The photo-orientable moieties can, for example, be covalently bonded within the main chain or within a side chain of a polymer or oligomer or they may be part of a monomer or other compounds which are not polymerizable. A photo-orientable substance may further be a copolymer comprising different types of photo-orientable moieties or it may be a copolymer comprising side chains with and without photo-orientable moieties.

Polymers denotes for example to polyacrylate, polymethacrylate, polyimide, polyurethane, polyamic acids, polymaleinimide, poly-2-chloroacrylate, poly-2-phenylacrylate; unsubstituted or with $C_1$-$C_6$alkyl substituted poylacrylamide, polymethacyrlamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmethacrylates with alkyl residues of 1-20 carbon atoms; polyacrylnitril, polymethacrylnitril, cycloolephinic polymers, polystyrene, poly-4-methylstyrene or mixtures thereof.

A photo-orientable substance may also comprise photosensitizers, for example, ketocoumarines and benzophenones.

Further, preferred photo-orientable monomers or oligomers or polymers are described in U.S. Pat. Nos. 5,539,074, 6,201,087, 6,107,427, 6,632,909 and 7,959,990.

Alignment of the LCP can be achieved by any other known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush or rub the support or imprint a directional microstructure to generate alignment capability.

The steps of polymerizing the LCP compounds and exposure to aligning light may be in any sequence. Polymerization may be initiated before or after exposure to aligning light. Or polymerization and exposure may occur simultaneously.

The LCP compositions or formulations may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

The compositions and formulations according to the present invention show improved retardation patterns compared to the compositions and formulations of the prior art and containing only one LCP compound.

The invention will now be described with reference to the following non-limiting examples. These examples are provided by way of illustration only. Variations on these examples falling within the scope of the invention will be apparent to a skilled person.

EXAMPLES

The following examples are provided to illustrate further and to facilitate understanding of the present invention and are not in any way intended to limit the invention.

Example 1

Synthesis of [2-[(E)-[methyl(quinoxalin-2-yl)hydrazono]methyl]-4-(4-propylcyclohexanecarbonyl)oxyphenyl] 4-(6-prop-2-enoyloxyhexoxy)benzoate compound 1

Synthesis of (3-formyl-4-hydroxy-phenyl) 4-propylcyclohexanecarboxylate

To a solution of 2,5-dihydroxybenzaldehyde (1.38 g, 10 mmol), trans-4-propylcyclohexane-carboxylic acid (1.79 g, 10.5 mmol) and 4-dimethylaminopyridine (DMAP) (122 mg, 1 mmol) in dry dichloromethane (20 mL), 1-(3-dimethylaminopropyl)-3-ethylcarbodiimide (EDC) (1.94 mL, 11 mmol) was added slowly. The reaction mixture was stirred for 22 hours at ambient temperature. The reaction mixture was quenched with a saturated aqueous solution of sodium bicarbonate and extracted with dichloromethane. The organic phase was washed with brine, dried over anhydrous sodium sulfate and the solvent was removed under reduced pressure. The residue was purified by flash column chromatography on silica gel using ethyl acetate/hexane to give the title compound as a yellow solid (1.31 g, 45%).

$^1$H-NMR (400 MHz, CDCl$_3$) δ 10.90 (s, 1H), 9.85 (s, 1H), 7.31 (d, J=2.7 Hz, 1H), 7.23 (dd, J=9.1, 2.7 Hz, 1H), 6.99 (d, J=9.1 Hz, 1H), 2.44-2.52 (m, 1H), 2.11-2.15 (m, 2H), 1.86-1.90 (m, 2H), 1.50-1.57 (m, 2H), 1.29-1.39 (m, 3H), 1.17-1.23 (m, 2H), 0.97-1.04 (m, 3H), 0.87-0.92 (m, 3H)

Synthesis of [2-formyl-4-(4-propylcyclohexanecarbonyl)oxy-phenyl] 4-(6-prop-2-enoyloxyhexoxy) benzoate To a solution of (3-formyl-4-hydroxy-phenyl) 4-propylcyclohexanecarboxylate (1.3 g, 4.5 mmol), 4-(6-acryloyloxy-hex-1-yloxy)benzoic acid (1.38 g, 4.70 mmol) and 4-dimethylaminopyridine (DMAP) (55 mg, 0.45 mmol) in dry dichloromethane (9 mL), 1-(3-dimethylaminopropyl)-3-ethylcarbodiimide (EDC) (0.87 mL, 4.93 mmol) was added. The reaction mixture was stirred for 5 hours at ambient temperature. The reaction mixture was quenched with a saturated aqueous solution of sodium bicarbonate and extracted with ethyl acetate. The organic phase was washed with brine, dried over anhydrous sodium sulfate and the solvent was removed under reduced pressure. The residue was purified by flash column chromatography on silica gel using ethyl acetate/hexane to give the title compound as a beige oil (2.73 g) containing some impurities, which was used for the next reaction without further purification.

Synthesis of [2-[(E)-[methyl(quinoxalin-2-yl)hydrazono]methyl]-4-(4-propylcyclohexanecarbonyl)oxyphenyl] 4-(6-prop-2-enoyloxyhexoxy)benzoate compound 1

(±) 10-Camphorsulfonic acid (105 mg, 0.45 mmol) was added to a solution of [3-formyl-4-(4-propylcyclohexanecarbonyl)oxy-phenyl] 4-(6-prop-2-enoyloxyhexoxy)benzoate (2.73 g, 4.5 mmol), 1-methyl-1-quinoxalin-2-yl-hydrazine (0.82 g, 4.7 mmol), and 4-hydroxy-2,2,6,6-tetramethylpiperidine 1-oxyl free radical (TEMPO-OH) (9 mg, 0.05 mmol) in dry tetrahydrofuran (45 mL) under an atmosphere of nitrogen. The resulting solution was stirred for 24 hours at ambient temperature. The reaction mixture was quenched with a saturated aqueous solution of sodium bicarbonate and extracted with dichloromethane. The organic phase was washed with brine, dried over anhydrous sodium sulfate and the solvent was removed under reduced pressure. The title compound as a gray solid (1.61 g, 50%) was obtained after recrystallization from dichloromethane/hexane.

$^1$H-NMR (400 MHz, DMSO-d6) δ 9.39 (s, 1H), 8.14 (d, J=9.1 Hz, 2H), 7.90-7.92 (m, 2H), 7.85-7.86 (m, 1H), 7.75-7.77 (m, 1H), 7.67-7.71 (m, 1H), 7.52-7.56 (m, 1H), 7.39 (d, J=8.7 Hz, 1H), 7.20 (dd, J=8.7, 2.7 Hz, 1H), 7.12 (d, J=8.7 Hz, 2H), 6.32 (dd, J=17.2, 1.6 Hz, 1H), 6.17 (dd, J=17.4, 10.5 Hz, 1H), 5.93 (dd, J=10.3, 1.6 Hz, 1H), 4.07-4.13 (m, 4H), 3.62 (s, 3H), 2.11-2.15 (m, 2H), 1.72-1.84 (m, 4H), 1.61-1.68 (m, 2H), 1.37-1.54 (m, 7H), 1.27-1.35 (m, 3H), 1.16-1.21 (m, 2H), 0.95-1.04 (m, 2H), 0.87 (t, J=7.1 Hz, 3H).

Example 2

Synthesis of [3-[(E)-(3-methylcarbazol-9-yl)iminomethyl]-4-[4-(6-prop-2-enoyloxyhexoxy)benzoyl]oxy-phenyl]4-(6-prop-2-enoyloxyhexoxy)benzoate compound 2

Synthesis of [3-formyl-4-[4-(6-prop-2-enoyloxyhexoxy)benzoyl]oxy-phenyl] 4-(6-prop-2-enoyloxyhexoxy)benzoate Oxalyl chloride (2.5 mL, 29 mmol) was added dropwise to a solution of 4-(6-acryloyloxy-hex-1-yloxy)benzoic acid (6.98 g, 24 mmol) in 48 mL of anhydrous toluene, 4 mg of 4-methoxyphenol and 1 mL of anhydrous DMF at 45° C. After 2 h, the reaction mixture was cooled down to 0° C. and added dropwise at 0-5° C. to a solution of 2,5-dihydroxybenzaldehyde (1.5 g, 11 mmol) in 40 mL of anhydrous DMA and N,N-dimethylcyclohexylamine (7.8 g, 52 mmol). The reaction mixture was stirred at ambient temperature overnight. The orange solution was quenched by addition of 15 mL of water, extracted with dichloromethane and successively washed with water, brine, dried over sodium sulfate and concentrated under vacuum. The title compound was obtained as a white solid (4.19 g, 56%) after recrystallization from dichloromethane/methanol.

Synthesis of 9-amino-3-methylcarbazole

To a suspension of 3-methylcarbazole (4.8 g, 26.5 mmol) and potassium hydroxide (11.9 g, 212 mmol) in dry DMF (53 mL), solution of Hydroxylamine-O-sulfonic acid (HOSA) (5.99 g, 53 mmol) in dry DMF (106 mL) was added dropwise for 65 min at 0° C. After addition, the reaction mixture was quenched with water and extracted with ethyl acetate/hexane=3/1. The organic phase was successively washed with water, brine, dried over anhydrous sodium sulfate and the solvent was removed under reduced pressure to give the title compound as a beige solid (5.1 g, 98%).

$^1$H-NMR (400 MHz, DMSO-d$_6$) δ 8.04 (d, J=7.8 Hz, 1H), 7.88 (s, 1H), 7.54 (d, J=8.2 Hz, 1H), 7.47 (d, J=8.2 Hz, 1H), 7.41 (td, J=7.7, 1.1 Hz, 1H), 7.26 (dd, J=8.2, 1.4 Hz, 1H), 7.12 (t, J=7.5 Hz, 1H), 5.76 (s, 2H), 2.46 (s, 3H).

Synthesis of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate, compound 2

(±) 10-Camphorsulfonic acid (18.6 mg, 0.08 mmol) was added to a solution of [3-formyl-4-[4-(6-prop-2-enoyloxyhexoxy)benzoyl]oxy-phenyl] 4-(6-prop-2-enoyloxyhexoxy)benzoate described (0.57 g, 0.83 mmol) and 9-amino-3-methyl-carbazole (0.20 g, 1 mmol) in 8 mL of dry tetrahydrofuran under an atmosphere of nitrogen. The resulting solution was stirred for 17 hours at ambient temperature. After completion of the reaction, the reaction mixture was quenched with a saturated aqueous solution of sodium bicarbonate and extracted twice with dichloromethane. The organic phase was washed with brine, dried over anhydrous sodium sulfate and the solvent was removed under reduced pressure. The title compound as a beige solid (0.42 g, 59%) was obtained after recrystallization from dichloromethane/hexane.

$^1$H-NMR (400 MHz, DMSO-d$_6$) δ 9.14 (s, 1H), 8.23 (d, J=9.1 Hz, 2H), 8.09-8.15 (m, 4H), 7.96 (s, 1H), 7.70 (d, J=7.3 Hz, 1H), 7.64 (d, J=8.2 Hz, 1H), 7.48-7.55 (m, 2H), 7.22-7.30 (m, 2H), 7.10-7.18 (m, 5H), 6.29-6.34 (m, 2H), 6.13-6.21 (m, 2H), 5.90-5.95 (m, 2H), 4.08-4.14 (m, 8H), 2.43 (s, 3H), 1.76-1.79 (m, 4H), 1.59-1.68 (m, 4H), 1.40-1.49 (m, 8H); MALDI-TOF (CHCA) 887.35 (M$^+$+Na).

Example 3

Synthesis of [2-[(E)-[1,3-benzothiazol-2-yl(hexyl)hydrazono]methyl]-4-(4-butylcyclohexanecarbonyl)oxy-phenyl]4-(6-prop-2-enoyloxyhexoxy)benzoate compound 3

Synthesis of 1-(1,3-benzothiazol-2-yl)-1-hexyl-hydrazine

A four-necked reactor was charged with 2-hydrazinobenzothiazole (3.5 g, 0.020 mol) and 20 mL of DMF. NaOH (1.25 g, 0.030 mol) was slowly added under a nitrogen stream. After the addition of 1-Bromohexane (4.05 g, 0.024 mol), the mixture was heated to 60° C. for 4 hours. After the completion of the reaction, the reaction mixture was cooled down to 25° C. and added to 200 mL of water and 100 mL of heptane. The precipitate was filtered off to give 2.45 g as a white solid.

Synthesis of (3-formyl-4-hydroxy-phenyl) 4-buthylcyclohexanecarboxylate

A solution of DCC (22.9 g, 0.11 mol) in 60 mL of dichloromethane was added dropwise to a cooled mixture of 2,5-dihydroxybenzaldehyde (13.95 g, 0.1 mol), trans-4-butylcyclohexanecarboxylic acid (19.55 g, 0.105 mol) and 4-dimethylaminopyridine (1.25 g, 0.01 mol) in 180 mL of dichloromethane. The reaction mixture was stirred at ambient temperature overnight. The mixture was filtered through Hyflo® super Cell® and the solution was concentrated under vacuum. The residue was dissolved in 250 mL of methanol and then the solution was cooled down to 0° C. The precipitate was filtered off and dried under vacuum at 40° C. to give 20.3 g of off-white solid.

Synthesis of [4-(4-butylcyclohexanecarbonyl)oxy-2-formyl-phenyl] 4-(6-prop-2-enoyloxyhexoxy)benzoate DCC (12.5 g, 0.060 mol) was added to a cooled mixture of (3-formyl-4-hydroxy-phenyl) 4-buthylcyclohexanecarboxylate (15.2 g, 0.050 mol), 4-(6-prop-2-enoyloxyhexoxy) benzoic acid (16.95 g, 0.055 mol) and 4-dimethylaminopyridine (0.6 g, 0.005 mol) in 175 mL of dichloromethane. The reaction mixture was stirred at ambient temperature overnight and was then filtered off through Hyflo® super Cell®. The resulting solution was concentrated under vacuum. The residue was dissolved in 350 mL of methanol and then the solution was cooled down to 0° C. The precipitate was filtered off and dried under vacuum at 40° C. to give 20.1 g of white solid.

Synthesis of [2-[(E)-[1,3-benzothiazol-2-yl(hexyl) hydrazono]methyl]-4-(4-butylcyclohexanecarbonyl) oxy-phenyl] 4-(6-prop-2-enoyloxyhexoxy)benzoate compound 3

DL-10-camphorsulfonic acid (0.40 g, 0.0016 mol) was added to a yellow solution of (9.35 g, 0.016 mol) [4-(4-butylcyclohexanecarbonyl)oxy-2-formyl-phenyl] 4-(6-prop-2-enoyloxyhexoxy)benzoate and 1-(1,3-benzothiazol-2-yl)-1-hexyl-hydrazine (4.75 g, 0.019 mol) dissolved in 120 mL of THF. The mixture was stirred at room temperature overnight. After addition of ethylacetate, the solution was washed with a 5 wt % solution of sodium hydrogen carbonate, dried over sodium sulfate and concentrated under vacuum. 11.2 g of the title compound was obtained as a grey white solid after recrystallization from methanol.

$^1$H NMR (400 MHz, DMSO-d6) δ: 8.15 (d, 2H), 7.81 (m, 2H), 7.58 (m, 2H), 7.42 (d, 1H), 7.32 (t, 1H), 7.25 (dd, 1H), 7.14 (m, 3H), 6.334 (dd, 1H), 6.18 (dd, 1H), 5.93 (d, 1H), 4.19 (t, 2H), 4.12 (m, 4H), 2.58 (tt, 1H), 2.12 (d, 2H), 1.92-0.80 (m, 32H), 0.72 (t, 3H).

Example 4

Synthesis of [3-[(E)-(3,6-dimethylcarbazol-9-yl) iminomethyl]-4-[4-(6-prop-2-enoyloxyhexoxy)benzoyl]oxy-phenyl]4-(6-prop-2-enoyloxyhexoxy)benzoate compound 4

Synthesis of 9-amino-3,6-dimethylcarbazole

To a suspension of 3,6-dimethylcarbazole (1.88 g, 9.6 mmol) and potassium hydroxide (8.6 g, 154 mmol) in dry DMF (19 mL), solution of Hydroxylamine-O-sulfonic acid (HOSA) (2.17 g, 19.2 mmol) in dry DMF (38 mL) was added dropwise for 10 min at 0° C. The reaction mixture was stirred at room temperature and quenched with water and extracted with a 1:2 mixture of ethyl acetate/hexane. The organic phase was successively washed with water, brine, dried over anhydrous sodium sulfate and the solvent was removed under reduced pressure. The residue was purified by flash column chromatography on silica gel using a 1:4 mixture of ethyl acetate/hexane to give the title compound as a white solid (1.7 g, 85%).

$^1$H-NMR (400 MHz, DMSO-d$_6$) δ 7.82 (s, 2H), 7.42 (d, J=8.2 Hz, 2H), 7.23 (dd, J=8.2, 1.4 Hz, 2H), 5.70 (s, 2H), 2.45 (s, 6H).

Synthesis of [3-formyl-4-[4-(6-prop-2-enoyloxyhexoxy)benzoyl]oxy-phenyl] 4-(6-prop-2-enoyloxyhexoxy)benzoate Oxalyl chloride (2.5 mL, 29 mmol) was added dropwise to a solution of 4-(6-acryloyloxy-hex-1-yloxy)benzoic acid (6.98 g, 24 mmol) in 48 mL of anhydrous toluene, 4 mg of 4-methoxyphenol and 1 mL of anhydrous DMF at 45° C. After 2 h, the reaction mixture was cooled down to 0° C. and added dropwise at 0-5° C. to a solution of 2,5-dihydroxy-benzaldehyde (1.5 g, 11 mmol) in 40 mL of anhydrous DMA and N,N-dimethylcyclohexylamine (7.8 g, 52 mmol). The reaction mixture was stirred at ambient temperature overnight. The orange solution was quenched by addition of 15 mL of water, extracted with dichloromethane and successively washed with water, brine, dried over sodium sulfate and concentrated under vacuum. The title compound was obtained as a white solid (4.19 g, 56%) after recrystallization from dichloromethane/methanol.

Synthesis of [3-[(E)-(3,6-dimethylcarbazol-9-yl) iminomethyl]-4-[4-(6-prop-2-enoyloxyhexoxy)benzoyl]oxy-phenyl] 4-(6-prop-2-enoyloxyhexoxy)benzoate (±) 10-Camphorsulfonic acid (46.5 mg, 0.2 mmol) was added to a solution of [3-formyl-4-[4-(6-prop-2-enoyloxyhexoxy)benzoyl]oxy-phenyl] 4-(6-prop-2-enoyloxyhexoxy)benzoate (1.37 g, 2.0 mmol) and 9-amino-3,6-dimethylcarbazole (0.50 g, 2.4 mmol) in 20 mL of dry tetrahydrofuran under an atmosphere of nitrogen. The resulting solution was stirred for 16 hours at ambient temperature. After completion of the reaction, the reaction mixture was quenched with a saturated aqueous solution of sodium bicarbonate and extracted with dichloromethane. The organic phase was washed with brine, dried over anhydrous sodium sulfate and the solvent was removed under reduced pressure. The title compound as a beige solid (0.541 g, 74%) was obtained after recrystallization from dichloromethane/hexane.

$^1$H-NMR (400 MHz, DMSO-d$_6$) δ 9.08 (s, 1H), 8.22 (d, J=9.1 Hz, 2H), 8.14 (d, J=8.7 Hz, 2H), 8.12 (d, J=2.7 Hz, 1H), 7.90 (s, 2H), 7.59 (d, J=8.2 Hz, 2H), 7.53 (d, J=8.7 Hz, 1H), 7.48 (dd, J=8.7, 2.7 Hz, 1H), 7.18 (d, J=8.7 Hz, 2H), 7.14 (d, J=8.7 Hz, 2H), 7.08 (dd, J=8.7, 1.4 Hz, 2H), 6.29-6.34 (m, 2H), 6.12-6.21 (m, 2H), 5.90-5.95 (m, 2H), 4.06-4.15 (m, 8H), 2.42 (s, 6H), 1.77 (td, J=12.8, 6.6 Hz, 4H), 1.59-1.68 (m, 4H), 1.41-1.52 (m, 8H); MALDI-TOF (CHCA) 901.35 (M$^+$+Na).

Example 5

Preparation of an orientation layer using Photoalignment Materials A glass substrate was spin-coated with a photoalignment composition (2% solid content of photoaligning polymer in cyclopentanone as described in the application example on page 40 of patent publication WO2012/085048). The film was dried at 80° C. for 30 s and the resulting film thickness was about 100 nm. Then the film was exposed to aligning light, which was collimated and linearly polarized UV (LPUV) light (280-320 nm) with 250 mJ/cm$^2$. The plane of polarization was 0° with regard to a reference edge on the substrate.

Example 6

A 10.0 w % solution of composition 1 was prepared by mixing 5.618 wt % of [3-[(E)-[methyl(quinoxalin-2-yl)hydrazono]methyl]-4-(4-propylcyclohexanecarbonyl)oxy-phenyl] 4-(6-prop-2-enoyloxyhexoxy)benzoate compound 1, of 0.0075 wt % of inhibitor 2,6-di-tert-butyl-4-methylphenol (to prevent premature polymerisation), 0.45 wt % of photoinitiator Irgacure® Oxe 02 (manufactured by BASF), 0.45 wt % of [3-(3-sulfanylpropanoyloxy)-2,2-bis(3-sulfanylpropanoyloxymethyl) propyl] 3-sulfanylpropanoate, 0.225 w % of Tego® flow 425, 8.25 wt % of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate compound 2 in cyclohexanone and stirred thoroughly till the solid was completely dissolved at room temperature. The coating liquid was applied onto a glass plate with the orientation layer of Example 5 to form a liquid crystal film by spin coating. This film was dried at 105° C. for 5 min onto a temperature controlled hot plate. The sample was cooled down to room temperature and then photo-polymerised by irradiation with UV light using a Mercury lamp for approximately 2 min at room temperature under $N_2$ atmosphere to fix the orientation state of the liquid crystal.

Alignment quality of the liquid crystal in the film is checked by placing the film between two crossed polarizers and adjusted to obtain dark state. The alignment quality is defined to be very good, if the dark state show no defects and the liquid crystal is well oriented. The alignment quality is defined to be good if the dark state has light leakage because of liquid crystal's inhomogeneous orientation. The alignment quality is defined to be medium if the dark state has light leakage with some areas with crystallisation. The alignment quality is defined to be bad, if the liquid crystal is not oriented with absence of dark state. The resulting film of example 6 exhibited a very good alignment quality.

Example 7

A 15.0 w % solution of composition 2 was prepared by mixing 9.3675 wt % [3-[(E)-[methyl(quinoxalin-2-yl)hydrazono]methyl]-4-(4-propylcyclohexanecarbonyl)oxy-phenyl] 4-(6-prop-2-enoyloxyhexoxy)benzoate compound 1, 0.0075 wt % of inhibitor 2,6-di-tert-butyl-4-methylphenol, 0.45 wt % of photoinitiator Irgacure® Oxe 02, 0.45 wt % of [3-(3-sulfanylpropanoyloxy)-2,2-bis(3-sulfanylpropanoyloxymethyl)propyl] 3-sulfanylpropanoate, 0.225 w % of Tego® flow 425, 4.5 wt % of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate compound 2 in cyclohexanone and stirred thoroughly till the solid was completely dissolved at room temperature. The film was prepared as described in example 6 and was dried at 105° C. for 5 min onto a temperature controlled hot plate. The resulting film exhibited a very good alignment quality.

Example 8

A 26.0 w % solution of composition 3 was prepared by mixing 21.4370 wt % [2-[(E)-[1,3-benzothiazol-2-yl(hexyl)hydrazono]methyl]-4-(4-butylcyclohexanecarbonyl)oxy-phenyl] 4-(6-prop-2-enoyloxyhexoxy)benzoate, 0.013 wt % of inhibitor 2,6-di-tert-butyl-4-methylphenol, 0.45 wt % of photoinitiator Irgacure® Oxe 03, 0.78 wt % of [3-(3-sulfanylpropanoyloxy)-2,2-bis(3-sulfanylpropanoyloxymethyl)propyl] 3-sulfanylpropanoate, 0.390 w % of Tego® flow 425, 2.6 wt % of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate in cyclohexanone and stirred thoroughly till the solid was completely dissolved at room temperature. The film was prepared as described in example 6 and was dried at 68° C. for 2 min onto a temperature controlled hot plate. The resulting film exhibited a very good alignment quality.

Example 9

A 35.0 w % solution of composition 4 was prepared by mixing 9.2075 wt % [2-[(E)-[1,3-benzothiazol-2-yl(hexyl)hydrazono]methyl]-4-(4-butylcyclohexanecarbonyl)oxy-phenyl] 4-(6-prop-2-enoyloxyhexoxy)benzoate, 0.0175 wt % of inhibitor 2,6-di-tert-butyl-4-methylphenol, 0.7 wt % of photoinitiator Irgacure® Oxe 03, 1.05 wt % of [3-(3-sulfanylpropanoyloxy)-2,2-bis(3-sulfanylpropanoyloxymethyl)propyl] 3-sulfanylpropanoate, 0.525 w % of Tego® flow 425, 3.5 wt % of [3-[(E)-(3,6-dimethylcarbazol-9-yl)iminomethyl]-4-[4-(6-prop-2-enoyloxyhexoxy)benzoyl]oxy-phenyl] 4-(6-prop-2-enoyloxyhexoxy)benzoate in cyclohexanone and stirred thoroughly till the solid was completely dissolved at room temperature. The film was prepared as described in example 6 and was dried at 70° C. for 2 min onto a temperature controlled hot plate. The resulting film exhibited a very good alignment quality.

Example 10

A 15.0 w % solution of composition 5 was prepared by mixing 11.2425 wt % [2-[(E)-[1,3-benzothiazol-2-yl(hexyl)hydrazono]methyl]-4-(4-butylcyclohexanecarbonyl)oxy-phenyl] 4-(6-prop-2-enoyloxyhexoxy)benzoate, 0.0075 wt % of inhibitor 2,6-di-tert-butyl-4-methylphenol, 0.3 wt % of photoinitiator Irgacure® Oxe 03, 0.3 wt % of [3-(3-sulfanylpropanoyloxy)-2,2-bis(3-sulfanylpropanoyloxymethyl)propyl] 3-sulfanylpropanoate, 0.150 w % of Tego® flow 425, 3.0 wt % of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate compound 2 in cyclohexanone and stirred thoroughly till the solid was completely dissolved at room temperature. The film was prepared as described in example 6 and was dried at 80° C. for 5 min onto a temperature controlled hot plate. The resulting film exhibited a very good alignment quality.

Example 11

A 15.0 w % solution of composition 6 was prepared by mixing 9.7425 wt % [2-[(E)-[1,3-benzothiazol-2-yl(hexyl)hydrazono]methyl]-4-(4-butylcyclohexanecarbonyl)oxy-phenyl] 4-(6-prop-2-enoyloxyhexoxy)benzoate, 0.0075 wt % of inhibitor 2,6-di-tert-butyl-4-methylphenol, 0.3 wt % of photoinitiator Irgacure® Oxe 03, 0.3 wt % of [3-(3-sulfanylpropanoyloxy)-2,2-bis(3-sulfanylpropanoyloxymethyl)propyl] 3-sulfanylpropanoate, 0.150 w % of Tego® flow 425, 4.5 wt % of [3-[(E)-(3-methylcarbazol-9-yl)iminomethyl]-4-[4-(6-prop-2-enoyloxyhexoxy)benzoyl]oxy-phenyl] 4-(6-prop-2-enoyloxyhexoxy)benzoate compound 2 in cyclohexanone and stirred thoroughly till the solid was completely dissolved at room temperature. The film was prepared as described in example 6 and was dried at 77° C. for 5 min onto a temperature controlled hot plate. The resulting film exhibited a very good alignment quality.

Example 12: Comparative Example

A 30.0 wt % solution of comparative example is prepared by mixing 28.05 wt % of compound 2, 0.15 wt % of inhibitor 2,6-di-tert-butyl-4-methylphenol, 0.9 wt % of photoinitiator Irgacure® Oxe 03 and 0.9 wt % of Tinuvin 123 in cyclohexanone and stirred thoroughly till the solid is completely dissolved at room temperature. The film was prepared as described in example 6 and was dried at 105° C. for 5 min onto a temperature controlled hot plate. The resulting film exhibited a very good alignment quality.

Example 13

The retardation of the samples described in example 6 to example 11 was measured with an Ellipsometer. Table 1 shows the results of the retardation for compositions 1 and 2. Table 2 shows the results of the retardation for composition 3 to composition 6. Value $Re_{450}$ represents the retardation of the film at a wavelength of 450 nm, value $Re_{550}$ represents the retardation of the film at a wavelength of 550 nm and value $Re_{650}$ represents the retardation of the film at a wavelength of 650 nm.

TABLE 1

| Composition | LCP 1 (wt % in total LCP) | LCP 2 (w % in total LCP) | $Re_{450}/Re_{550}$ | $Re_{650}/Re_{550}$ |
|---|---|---|---|---|
| Comparative example | Group IIa - Compound 2 (100) | — | 1.00 | 1.00 |
| 1 | Group IIa - Compound 2 (59.5) | Group IIb- Compound 1 (40.5) | 0.98 | 1.00 |
| 2 | Group IIa- Compound 2 (32.4) | Group IIb- Compound 1 (67.6) | 0.83 | 1.02 |

TABLE 2

| Composition | LCP 1 (wt % in total LCP) | LCP 2 (w % in total LCP) | $Re_{450}/Re_{550}$ | $Re_{650}/Re_{550}$ |
|---|---|---|---|---|
| Comparative example | Group IIa - Compound 2 (100) | — | 1.00 | 1.00 |
| 3 | Group IIa - Compound 2 (10.8) | Group IIc - Compound 3 (89.2) | 0.85 | 1.03 |
| 4 | Group IIa - Compound 4 (10.7) | Group IIc - Compound 3 (89.3) | 0.84 | 1.03 |
| 5 | Group IIa - Compound 2 (21.1) | Group IIc - Compound 3 (78.9) | 0.88 | 1.02 |
| 6 | Group IIa - Compound 2 (31.6) | Group IIc - Compound 3 (68.4) | 0.90 | 1.02 |

For improving color, a value of $Re_{650}/Re_{550}$ higher than 1.00 and below 1.2 is preferred. In addition, a $Re_{450}/Re_{550}$ value below 0.90 is preferred. Table 1 shows results of retardation characteristics of the liquid crystal composition 1 and 2 comprising one LCP from the group IIa and one LCP from the group IIb. Table 2 shows results of retardation characteristics of the liquid crystal composition 3 to 6 comprising one LCP from the group IIa and one LCP from the groupd IIc.

The $Re_{650}/Re_{550}$ of the films from compositions 2 and 6 is found to be significantly higher than the $Re_{650}/Re_{550}$ of liquid crystal composition of the comparative example with $Re_{650}/Re_{550}$ values up to 1.03. Furthermore, the $Re_{450}/Re_{550}$ value considerably decreases in the compositions 2 to 6 compared to the $Re_{450}/Re_{550}$ value of the comparative example and it reaches values between 0.83 to 0.90. The new compositions according to the present invention show improved retardation characteristics compared to the containing only one LCP compound comparative example.

The invention claimed is:

1. A composition comprising at least two anisotropic compounds of formula (I)

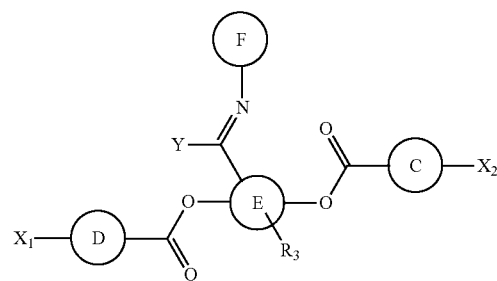

wherein rings C and D are independently from each other selected from the group consisting of phenyl, biphenyl, naphthyl, cycloalkyl, bicyclohexyl

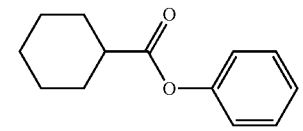

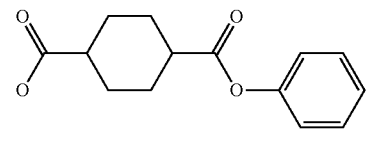

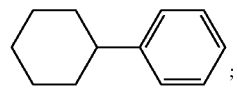

;

ring E is selected from the group consisting of phenyl, biphenyl and naphthyl;

ring F is selected from the group consisting of the groups of formulae (IIa), (IIb) or (IIc)

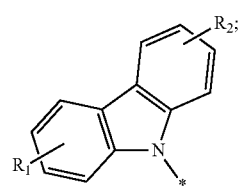
(IIa)

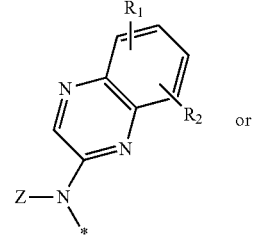
(IIb)

or

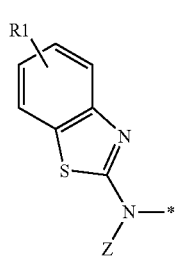

(IIc)

wherein "*" represents the bonding to ring the nitrogen atom of the compound of formula (I); $X_1$ and $X_2$ are independently from each other selected from the group consisting of hydrogen, $C_1$-$C_{12}$ substituted or unsubstituted straight alkyl chain or $C_3$-$C_{12}$ substituted or unsubstituted branched alkyl chain, $C_3$-$C_{12}$ substituted or unsubstituted straight chain or branched alkenyl chain and $C_1$-$C_{12}$ alkoxy, wherein one or more carbon atoms may be replaced by —O—, —COO—, —OCO—, —OOC—, —O(CO)O—, —N—, —NR$^a$—, —CON—, wherein R$^a$ is a $C_1$-$C_{12}$ alkyl group; or $X_1$ and $X_2$ independently from each other are represented by the group of formula (III)

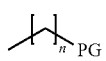

(formula III)

wherein n is an integer between 0 and 24; and wherein one or more carbon atoms may be replaced by —O—, —COO—, —OCO—, —OOC—, —O(CO)O—, —N—, —NR$^a$—, —CON—, wherein R$^a$ is a $C_1$-$C_{12}$ alkyl group; and wherein PG represents a polymerisable group selected from the group consisting of $CH_2$=C(Ph)-, $CH_2$=CW—COO—, $CH_2$=CH—COO-Ph-, $CH_2$=CW—CO—NH—, $CH_2$=CH—O—, $CH_2$=CH—OOC—, Ph-CH=CH—, $CH_2$=CH-Ph-, $CH_2$=CH-Ph-O—, R$^b$-Ph-CH=CH—COO—, R$^b$—OOC—CH=CH-Ph-O— and 2-W-epoxyethyl; in which W represents H, Cl, Ph or a lower alkyl and R$^b$ represents a lower alkyl with the proviso that when R$^b$ is attached to a phenylene group (-Ph-) it may also represent hydrogen or a lower alkoxy;

Y is selected from the group consisting of H, or substituted or unsubstituted alkyl group having 1 to 12 carbon atoms;

$R_1$, $R_2$ and $R_3$ are independently from each other selected from the group consisting of hydrogen, $C_1$-$C_{12}$ straight alkyl chain, $C_3$-$C_{12}$ branched alkyl chain, $C_3$-$C_{12}$ alkenyl, $C_1$-$C_{12}$ alkoxy, $C_3$-$C_{12}$ alkenyloxy, —(CH$_2$)$_m$—C(CH$_3$)$_3$, NO$_2$, CN, COR, —COOR, —OCOR, —CONR'R, —NR'COR, OCOOR, —OCONR'R, —NR'COOR, —F, —Cl, —CF$_3$ and —OCF$_3$;

in which m is an integer between 0 and 12;

R is selected from the group consisting of hydrogen, an $C_{1-18}$ alkyl group, an $C_{3-18}$ alkenyl group with the double bond at 3-position or higher, —(CH$_2$)$_p$—C—(CF$_3$)$_3$, CN and unsubstituted or substituted phenyl ring, wherein the substituent of the phenyl ring is selected from the group consisting of $C_1$-$C_6$ straight alkyl chain, $C_3$-$C_6$ branched alkyl chain, $C_1$-$C_6$ alkoxy, —C—(CH$_3$)$_3$, halogen, —CF$_3$, NO$_2$, CN, COR''', —COOR''', —OCOR''', —CONR"R''', —NR"COR''', OCOOR''', —OCONR"R''', —NR"COOR''', —F, —Cl, —CF$_3$ and —OCF$_3$;

in which

R" is selected from the group consisting of hydrogen, a lower alkyl group and a lower alkenyl group;

R''' is selected from the group consisting of hydrogen, an $C_{1-18}$ alkyl group and an $C_{3-18}$ alkenyl group with the double bond at 3-position or higher;

p is an integer between 0 and 12;

R' is selected from the group consisting of hydrogen, lower alkyl, lower alkenyl and lower alkoxy;

Z is selected from the group consisting of hydrogen, a substituted or unsubstituted alkyl group having 1 to 20 carbon atoms, a substituted or unsubstituted alkenyl group having 2 to 20 carbon atoms, a substituted or unsubstituted cycloalkyl group having 3 to 12 carbon atoms, a substituted or unsubstituted alkynyl group having 2 to 20 carbon atoms, wherein one or more carbon atoms may be replaced by —O—, —COO—, —OCO—, —OOC—, —O(CO)O—, —N—, —NR$^a$—, —CON—, —CO—R$^{b'}$-, —NH—R$^c$, wherein R$^a$ is a $C_1$-$C_{12}$ alkyl group, R$^b$ and R$^c$ are independently from each other a substituted or unsubstituted alkyl group having 1 to 20 carbon atoms, or an organic group having 2 to 30 carbon atoms that includes at least one aromatic ring, or a substituted or unsubstituted alkenyl group having 2 to 20 carbon atoms, or a substituted or unsubstituted cycloalkyl group having 3 to 12 carbon atoms;

with the proviso that both anisotropic compounds are different and comprise two different rings F.

2. The composition according to claim 1, wherein in the first anisotropic compound, ring F is of formula (IIa) and in the second anisotropic compound ring F is of formula (IIb) or (IIc).

3. The composition according to claim 1, wherein rings C and D are independently from each other selected from the group consisting of: phenyl, cyclohexyl,

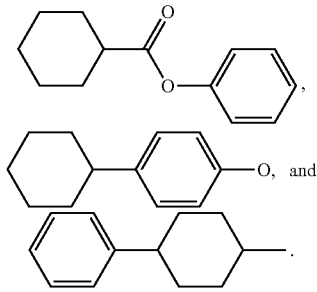

4. The composition according to claim 1, wherein n is an integer between 0 and 12.

5. The composition according to claim 4, wherein n is an integer between 4 and 8.

6. The composition according to claim 1, wherein in the group of formula (III) the one or more carbon atoms are replaced by —O—.

7. The composition according to claim 1, $R_1$, $R_2$ and $R_3$ are independently from each other selected from the group consisting of hydrogen, lower alkyl, lower alkenyl, lower alkoxy, lower alkenyloxy, —F, and —CF$_3$.

8. The composition according to claim 7, wherein $R_1$, $R_2$ and $R_3$ are independently from each other selected from the group consisting of hydrogen, methyl, methoxy, —F, —C—(CH$_3$)$_3$ and —CF$_3$.

9. The composition according to claim 1, wherein ring E is phenyl.

10. The composition according to claim 1, wherein Z is selected from the group consisting of hydrogen, a substituted or unsubstituted alky group having 1 to 12 carbon atoms.

11. The composition according to claim 1, wherein PG represents an acrylate or a methacrylate group.

12. The composition according to claim 1 wherein the anisotropic compounds are in cross-linked or polymerised form.

13. An LCP network comprising the composition according to claim 1.

14. A method of manufacturing an optical or an electro-optical device comprising:
producing an optical or an electro-optical device with (i) a composition according to claim 1 or (ii) an LCP network comprising the composition according to claim 1.

15. An optical or electro-optical device comprising (i) the composition according to claim 1 or (ii) an LCP network comprising the composition according to claim 1.

16. The composition according to claim 1, comprising at least a compound (1):

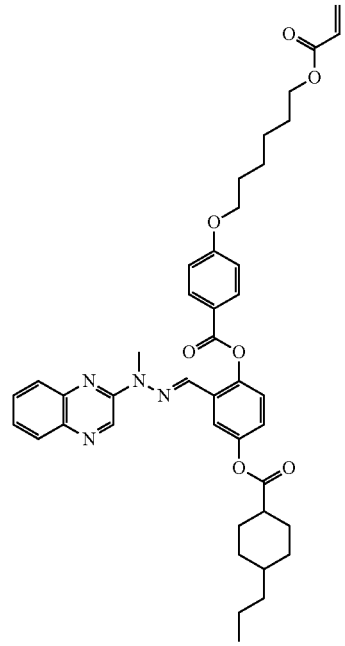 [SMILES: C=CC(=O)OCCCCCCOc1ccc(C(=O)Oc2ccc(OC(=O)C3CCC(CCC)CC3)cc2/C=N/N(C)c2cnc3ccccc3n2)cc1]

and a compound (2):

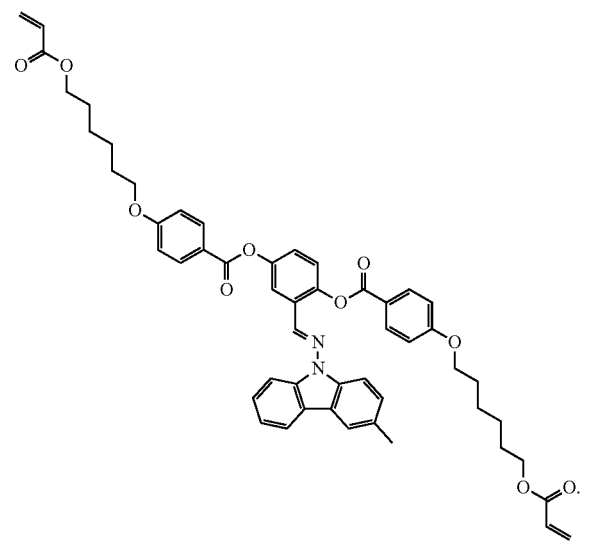 [SMILES: C=CC(=O)OCCCCCCOc1ccc(C(=O)Oc2ccc(OC(=O)c3ccc(OCCCCCCOC(=O)C=C)cc3)c(/C=N/n3c4ccccc4c4cc(C)ccc43)c2)cc1]

17. The composition according to claim 1, comprising at least a compound (2):

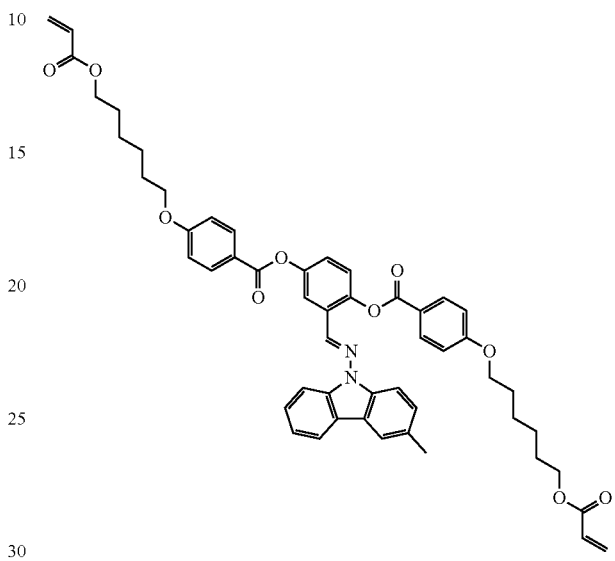

and a compound (3):

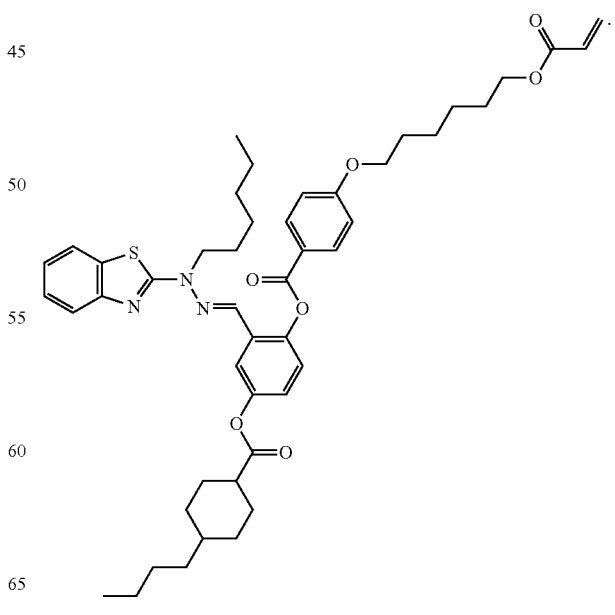

18. The composition according to claim 1, comprising at least a compound (3):
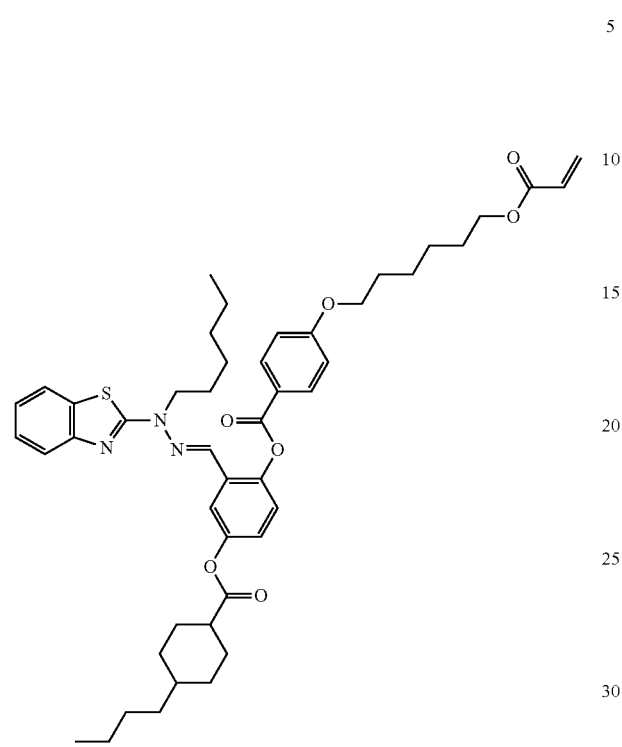
and a compound (4):
19. The composition according to claim 1, comprising at least a compound (1):
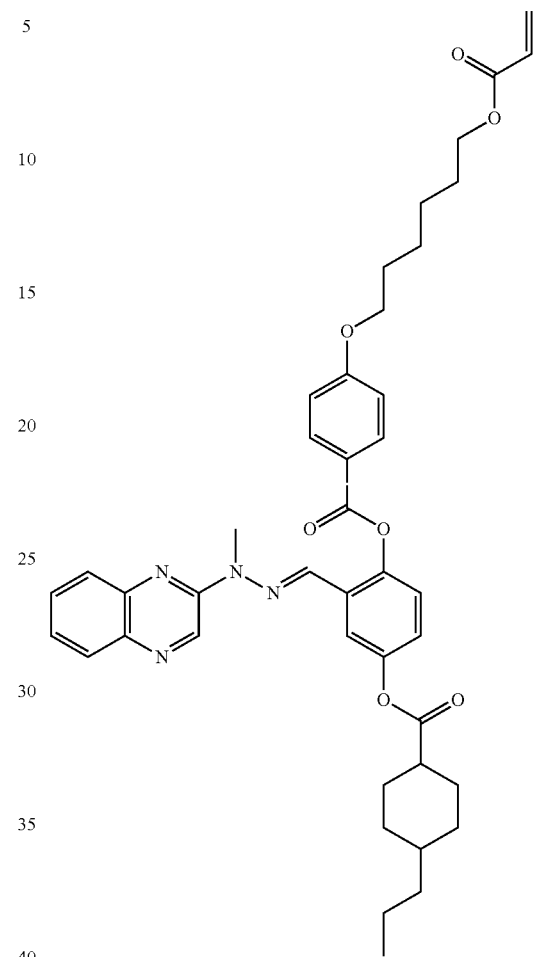
and a compound (3):
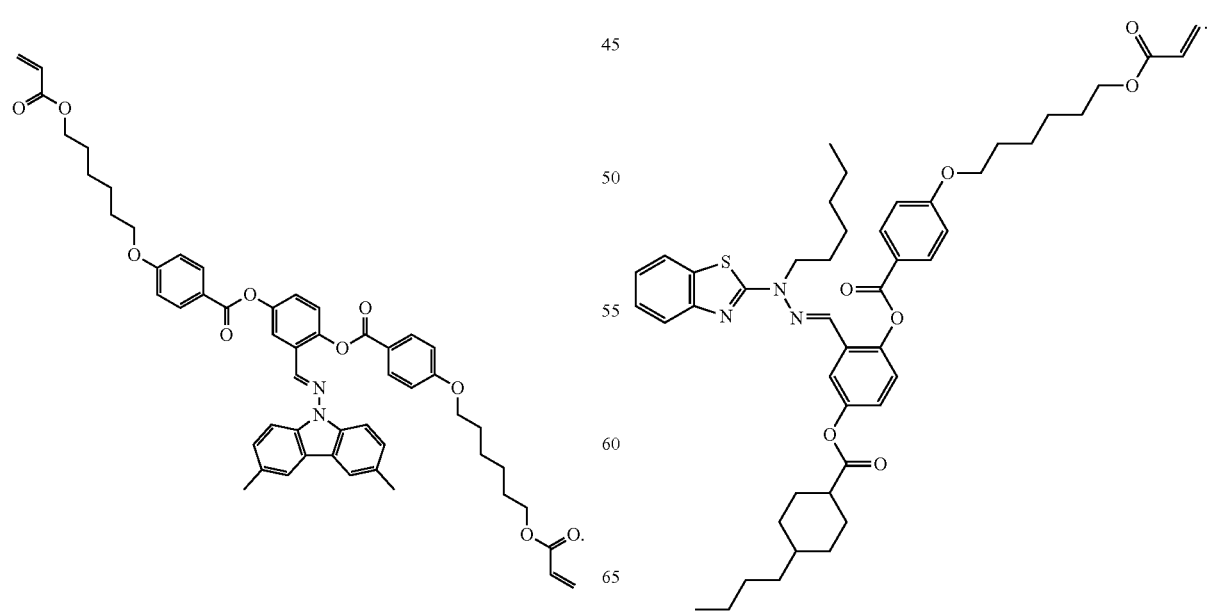

20. The composition according to claim 1, comprising at least a compound (2):
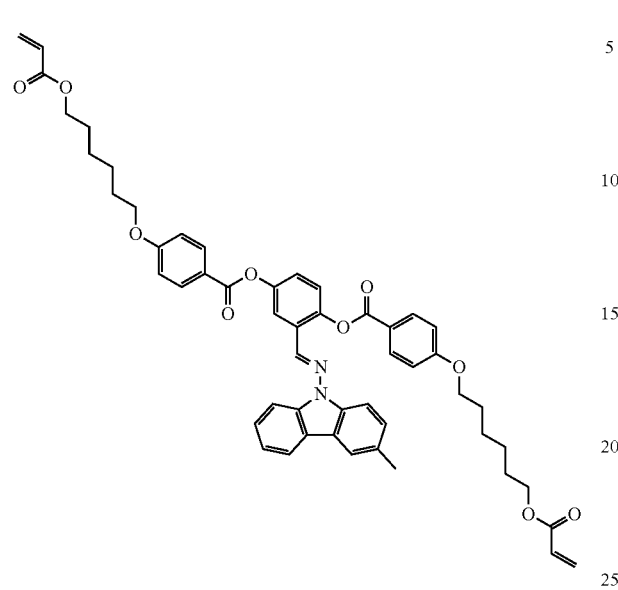
and a compound (4):
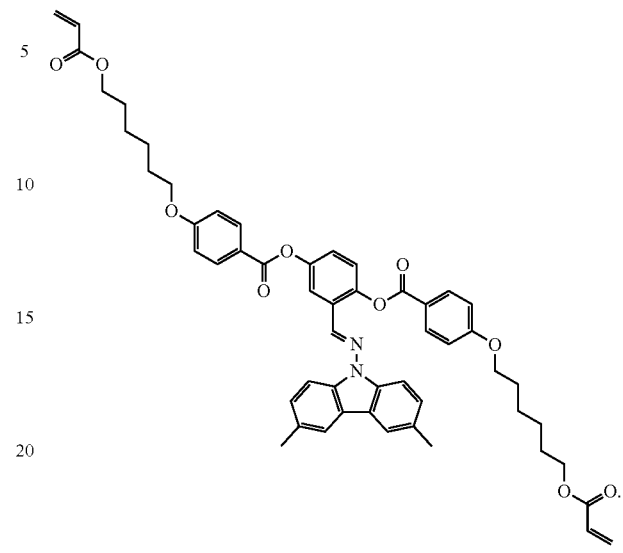
* * * * *